H. LE V. HORNING.
INTERNAL COMBUSTION ENGINE.
APPLICATION FILED APR. 9, 1917.
1,338,342.
Patented Apr. 27, 1920.
2 SHEETS—SHEET 1.
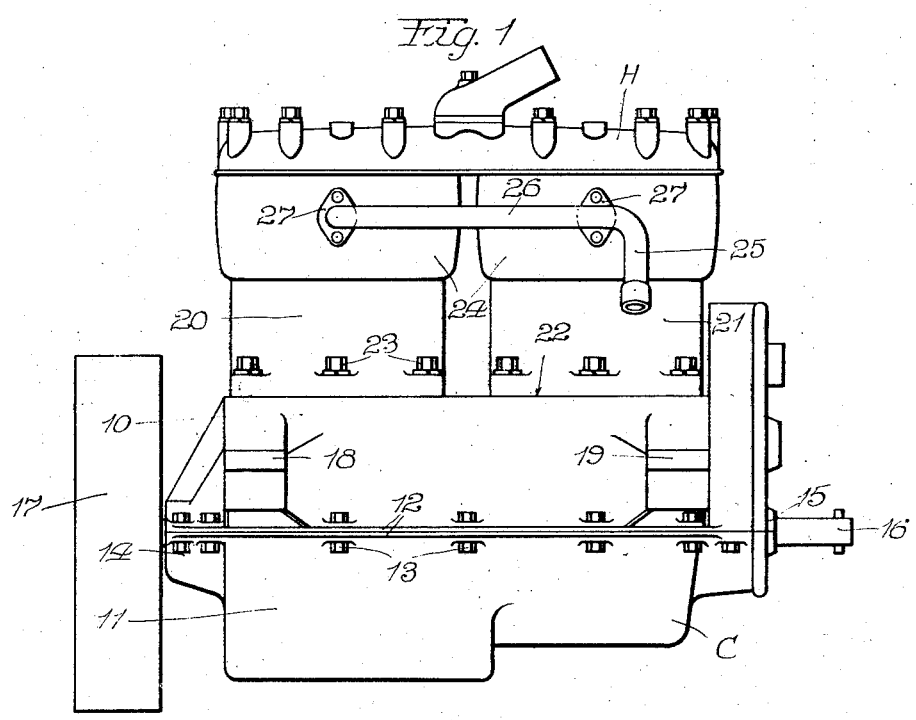
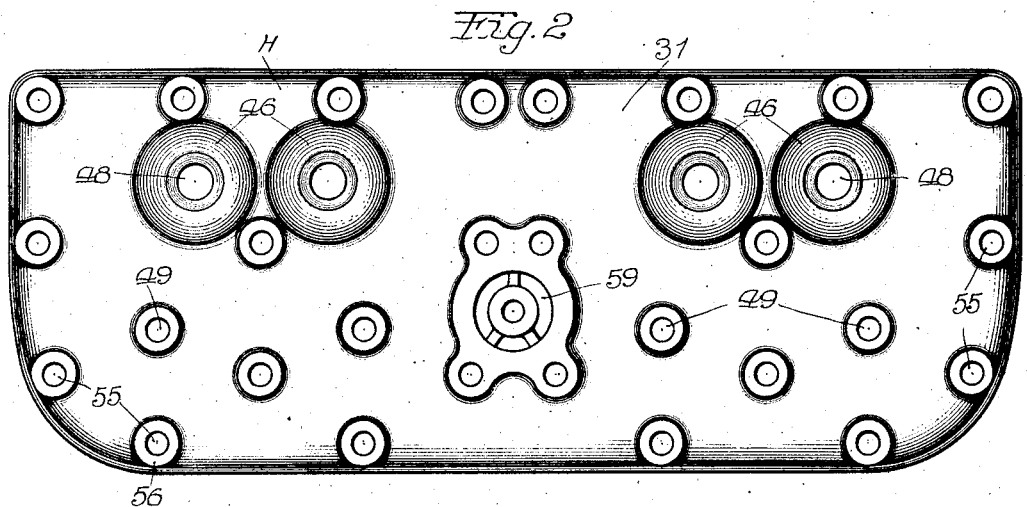
Inventor
Harry LeVan Horning
By Brown, Hanson & Bretteher
Attorneys

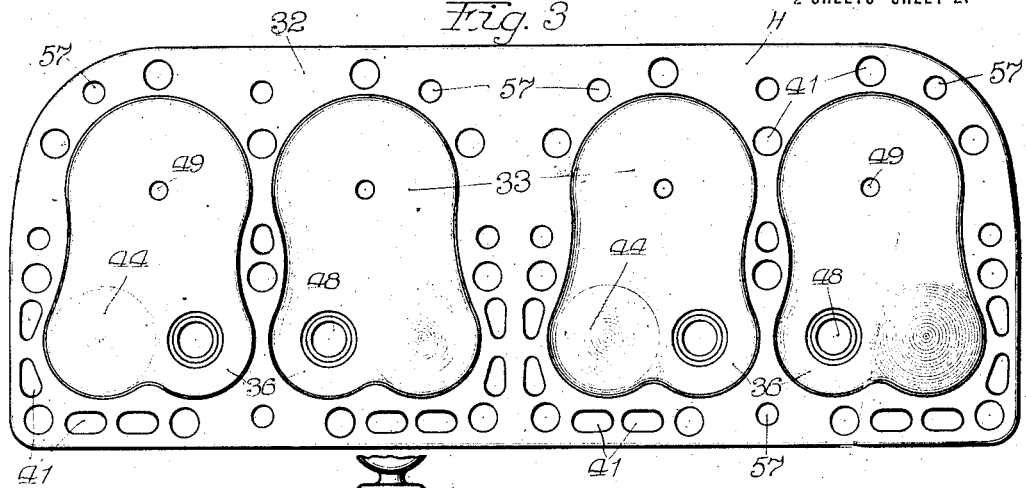
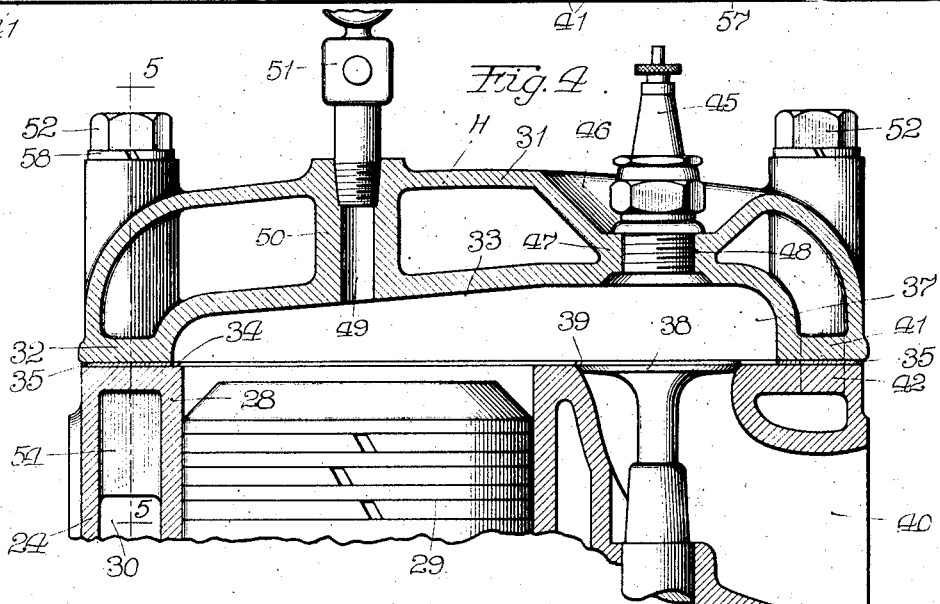
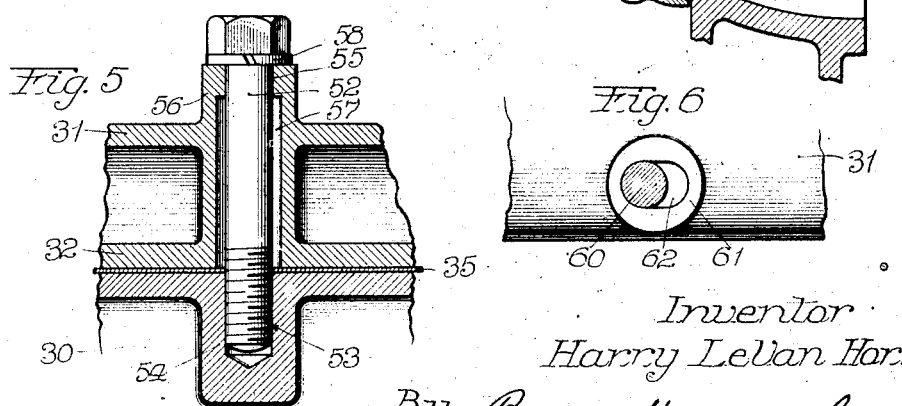

UNITED STATES PATENT OFFICE.

HARRY LE VAN HORNING, OF WAUKESHA, WISCONSIN, ASSIGNOR TO WAUKESHA MOTOR CO., OF WAUKESHA, WISCONSIN, A CORPORATION OF WISCONSIN.

INTERNAL-COMBUSTION ENGINE.

1,338,342.   Specification of Letters Patent.   Patented Apr. 27, 1920.

Application filed April 9, 1917. Serial No. 160,798.

*To all whom it may concern:*

Be it known that I, HARRY LE VAN HORNING, a citizen of the United States, residing at Waukesha, in the county of Waukesha and State of Wisconsin, have invented a certain new and useful Improvement in Internal-Combustion Engines, of which the following is a full, clear, concise, and exact description, reference being had to the accompanying drawings, forming a part of this specification.

The present invention relates to internal combustion engines.

The primary object of my invention is to produce an engine of the class referred to having a light, simple, compact and durable structure, which, in operation, consumes a relatively small amount of fuel, does not become unduly heated, delivers greater power and is efficient and economic in operation.

Another object of my invention is to provide a novel and improved arrangement of the cylinder structure, cylinder head or heads and crank case whereby these elements may be readily assembled or disassembled for inspection and repair.

My invention contemplates the provision of a cooled cylinder head having communication with the cylinder cooling jacket, the cylinder structure and head being formed of dissimilar metals, for instance steel and aluminum, respectively, whereby a cylinder structure may be made strong and durable to withstand the stresses and strains imposed thereon and the head may be made to prevent overheating which very often causes premature ignition and cracking of the gases, that is, breaking up and depositing carbon.

My invention also embodies an improved fastening method whereby the elements mentioned hereinbefore may be readily connected, said fastening method and the elements embodied permitting relative expansion and contraction of the various parts secured.

My invention also embodies an improved construction of gas or fuel inlet whereby the fuel is speeded just prior to entering the combustion chamber, for a purpose which will hereinafter appear.

Other objects of my invention not hereinbefore pointed out will appear from the following detailed description and claims, taken with an inspection of the accompanying drawings, in which—

Figure 1 is a side elevational view of an internal combustion engine embodying the improvements of my invention;

Fig. 2 is a top plan of a removable cylinder head;

Fig. 3 is a bottom plan of the same;

Fig. 4 is an enlarged fragmental vertical sectional view of the upper end of the cylinder structure and cylinder head;

Fig. 5 is a fragmental section taken on the line 5—5 of Fig. 4 looking in the direction of the arrows, said view illustrating the preferred form of fastening means; and Fig. 6 is a fragmental section of a modified form of fastening means.

Referring further to the drawings, wherein similar characters of reference designate like and corresponding parts throughout the various views, C designates in its entirety the crank case of my improved engine, the same being constructed of two detachable half-sections 10 and 11 provided with engaging flanges 12 through which pass securing bolts 13 or the like. The free ends of the crank case carry the usual bearings 14 and 15 for the crank shaft 16, on one end of which is mounted a fly wheel 17 in accordance with the usual practice. Shoulders 18 and 19 are formed on the crank case section 10, said shoulders being engaged with the chassis of the motor vehicle on which the engine is installed.

The crank case sections are formed of aluminum so as to insure lightness of the structure.

The cylinder structure of the engine embodies two portions 20 and 21, each containing a pair of cylinders cast *en bloc*, novel in this combination, as will be pointed out. The upper portion of the crank case section 10 is machined to a plane true surface 22 and the lower ends of the cylinder blocks 20 and 21 are adapted to abut the same, fastening bolts 23 serving to mount the sections 20 and 21 on the crank case.

The cylinder structure is constructed of cast steel or the like and the blocks 20 and 21 are provided with the usual form of cooling jackets 24, said jackets being slightly modified in a manner which will hereinafter appear, to adapt the same in connection with the removable cylinder head designated H, in its entirety.

A cooling medium, such as water or the like, is supplied to the jacket 24 through a feed pipe 25 communicating with a manifold 26, said manifold having connection at the points 27 with said jackets 24.

Referring to Fig. 4, a portion of the interior of one of the cylinder blocks is shown, the cylinder wall being designated 28 and having the usual piston 29 mounted for movement therein. A space 30 is provided between the cylinder and the jacket to receive the cooling medium.

The cylinder head H is constructed of aluminum so as to get high heat conductivity and is hollow, the same having an outer wall 31, the free margins of which are curved downwardly to meet the bottom wall 32. Said bottom wall is provided with a plurality of depressions 33 forming combustion chambers, one of said depressions being located over each of the cylinders. The upper ends of the cylinder blocks 20 and 21 are machined to form a true plane surface 34 against which the bottom wall 32 of the cylinder head is adapted to abut. A washer 35 is interposed between the bottom wall and said surface so as to seal the joint.

The intake and exhaust valves are arranged along one side of the cylinder structure in keeping with the usual practice, the depressions 33 being extended as at 36 to form the combustion chambers 37, one of which is best shown in Fig. 4. One of the intake valves is shown in Fig. 4 and designated 38, the same having a seat at 39. The intake port 40 preferably embodies the Venturi tube principle in that its intermediate portion is of less diameter than its ends so that the mixture fed through the port 40 is "speeded up."

Openings 41 and 42 are provided in the bottom wall 32 of the cylinder head and in the top portion of the cylinder blocks 20 and 21 respectively, said openings being grouped adjacent the exhaust valve and affording circulation of the cooling liquid between the jacket 24 and the cylinder head. By grouping the openings adjacent the exhaust valve the metal at these points is cooled. No openings are provided adjacent the intake valve in view of the fact that this would tend to chill the explosive mixture. The portions of the depression 33 located above the exhaust valve are polished as indicated at 44 in Fig. 3 so that the heat of the exploding gases is reflected rather than absorbed, thus further assisting in the cooling of the cylinder head.

Ignition is had by means of the usual form of spark plug designated 45, the top wall of the cylinder head being formed with a depression 46 connecting at 47 with the depression 33 in which threaded openings 48 are provided to receive the threaded shanks of the spark plugs. Provisions for priming are made in the form of a plurality of openings 49 extending through strengthening posts 50 extending between the outer wall 31 and the wall 32 in the depression thereof. Pet cocks 51 control admission through the openings 49.

To secure the cylinder head to the cylinder block it is necessary that some provision be made for the difference in expansion coefficients of aluminum and a cast steel or iron cylinder block. I accomplish the fastening of the cylinder head by means of a plurality of bolts 52 having threaded engagement at 53 with recessed enlargements 54 formed in the cylinder structure. The bolts pass through openings 55 formed in bosses 56 cast integrally with the cylinder head, the openings being axially enlarged as at 57 for greater parts of their lengths. A locking washer 58 is interposed between the head of the bolt and the top end of the boss. This structure is best shown in Fig. 5 and it will be noted that any relative movement of the cylinder head on the cylinder will be accommodated by virtue of the flexing of the bolts. It is impossible for the bolt to be sheared off by the difference in expansion between the iron and aluminum, this difference in expansion actually being small enough.

The outlet for the cooling medium is provided in a cylinder head at a point intermediate its length and is designated 59. Of course, any number of outlets might be provided and any desired arrangement of the same be made without departing from the spirit and scope of my invention. The location of the bolt openings and fastening devices has nothing to do with the essence of the invention, only the structure of said fastening elements being emphasized.

In Fig. 6 I have shown a modified arrangement of the fastening means. The bolt is designated 60, the boss 61 and the bolt opening 62. As will be apparent from Fig. 6, the bolt opening is elongated so that the metal of the cylinder head is free to move relative to both. In constructing a cylinder head and employing such fastening means it is obvious that from the intermediate portion of the cylinder head to the end the arrangement of the openings 62 would be relatively opposite since the expansion would be in opposite directions.

As will be obvious from Fig. 1, it is preferable that the cylinder head extend over the whole engine structure, that is, over the whole cylinder structure, embracing the blocks 20 and 21. However, I do not limit myself to the arrangement or number of cylinders employed since the head may be made as a single unit for a 12 cylinder engine or may be made in smaller units for 1 and 2 cylinder engines.

A feature of the intake port which I desire to emphasize resides in the fact that when the charge or explosive mixture is speeded up more gas is obtainable on a given stroke of the piston and the gas entering rapidly tends to cool to a desired degree the space adjacent the spark plug, thereby tending to eliminate the danger of cracking of the insulation of the same.

If desired, the method of fastening the cylinder head on the cylinder blocks may be employed for fastening the blocks on the crank case. However, since the difference in expansion between the crank case and the cylinder blocks is usually very slight, such a provision may not in some cases be required. The provision of the machined surfaces on the cylinder block and cylinder head and crank case facilitate expansion of the aluminum parts relative the cast steel or iron parts, and such expansion is accommodated by the flexing of the bolt. Overheating of the cylinder head is practically impossible in view of the free circulation of liquid from the jacket through said cylinder head and the high heat conductivity of the metal. It will be noted that the wall 32 adjacent the depression is inclined so that the charge, when exploded, is deflected downwardly into the cylinder tending to enhance the efficiency of each explosion. This is in keeping with the general idea involved in forming a Venturi intake port. The entrance of the gas through the Venturi intake not only tends to speed up the mixture but also cools the metal adjacent.

While I have shown and described my invention as embodying specific features of construction, I desire that it be understood that such changes may be made therein as do not depart from the spirit and scope of the invention as claimed.

I claim:

1. In combination, a steel cylinder structure having an unobstructed planar top and an aluminum cylinder head having an unobstructed planar bottom resting on said top, and fastening means for connecting said structure and head and permitting relative movement of the same under temperature changes.

2. In combination, a steel cylinder structure having an unobstructed planar top and having cooling jackets, a detachable aluminum cylinder head having an unobstructed planar bottom resting on said top, said cylinder head being hollow and having communication with the cylinder jackets to afford circulation of a cooling medium from the jackets to the head, and semi-rigid means for fastening the head on the cylinder structure.

3. In combination, a cylinder structure having water jackets provided with outlet openings and a hollow head having openings to aline with the openings from said jackets, said cylinder structure having intake and exhaust valves arranged in pairs, said openings in the head and jackets being grouped adjacent the exhaust valve.

4. In combination, a cylinder structure, and an aluminum head therefor, said cylinder structure having intake and exhaust valves, said head having depressions in the bottom wall thereof over said valves, the surface of said head in said depressions being polished to reflect the heat.

5. In combination, a cylinder structure of steel, having an unobstructed planar top, a hollow aluminum head for the cylinder having an unobstructed planar bottom resting on said top, said cylinder structure having liquid circulating jackets, said head being in communication with the jackets, a plurality of bosses on said head, said bosses having openings therein elongated in the direction of the length of the top and adapted to receive normally rigid fastening members engageable with the cylinder structure.

6. In combination, a cylinder structure of steel having an unobstructed planar top, a hollow aluminum head for the cylinder having an unobstructed planar bottom resting on said top, said cylinder structure having liquid circulating jackets, said head being in communication with the jackets, said cylinder structure having a plurality of threaded openings, a plurality of bosses on said head, said bosses having openings adapted to aline with the openings in said cylinder structure, the openings in said bosses being interiorly enlarged, bolts receivable in said openings and adapted to engage the threaded openings in the cylinder structure, said enlargements of the openings in said bosses permitting flexing of the bolts under different expansions of the cylinder structure and head.

7. In combination, a cylinder structure of steel having water jackets provided with outlet openings, an aluminum hollow head having openings to aline with the openings in said jackets, said cylinder structure having intake and exhaust valves arranged in pairs, said head having depressions in the bottom wall thereof over said valves, said openings in the head and jackets being grouped adjacent the exhaust valve to cool the same, and semi-rigid means for detachably fastening said head on said cylinder structure.

8. In combination, a cylinder structure of steel having water jackets provided with outlet openings, a hollow aluminum head having inlet openings to aline with the openings in said jackets, said cylinder structure having intake and exhaust valves arranged in pairs, said head having depressions in the bottom wall thereof over said valves, said openings being grouped adjacent the exhaust valves, the area in said depressions above the exhaust valves being polished to reflect the heat, and means for mounting said head on the cylinder structure, said means accommodating the variations in expansion and contraction of said head and cylinder structure.

9. In combination, a cylinder structure of steel having water jackets provided with outlet openings, a hollow aluminum head having inlet openings to aline with the openings in said jackets, said cylinder structure having intake and exhaust valves arranged in pairs, said head having depressions in the bottom wall thereof over said valves to form combustion chambers, said openings being grouped adjacent the exhaust valves, the spaces in said depressions above the exhaust valves being polished to reflect the heat, said cylinder structure having Venturi-shaped intake ports for speeding up the explosive mixture and assisting in cooling the area of the cylinder head adjacent the igniting device.

10. In an engine structure, a crank case, a pair of separate cylinder members mounted upon said case, and a common cylinder head mounted on top of said cylinder members.

11. In combination, a crank case of aluminum, a pair of steel cylinders mounted on said case, and a common cylinder head mounted on top of said cylinders.

12. In an internal combustion engine, an aluminum crank case, an aluminum cylinder head, and an open-ended steel cylinder interposed between the two, said steel cylinder having inlet and exhaust passages and a cylinder bore.

In witness whereof, I hereunto subscribe my name this fifth day of April, A. D. 1917.

HARRY LE VAN HORNING.